United States Patent [19]

Borowski, Jr.

[11] Patent Number: 5,529,363
[45] Date of Patent: Jun. 25, 1996

[54] THERMAL DRAFT GUARD FOR AUTOMOTIVE VEHICLES

[76] Inventor: Leonard R. Borowski, Jr., 138 Waughaw Rd., Towaco, N.J. 07082

[21] Appl. No.: 214,176

[22] Filed: Mar. 17, 1994

[51] Int. Cl.$^6$ ............................................. B62D 33/04
[52] U.S. Cl. ......................... 296/24.1; 160/368.1
[58] Field of Search ................ 296/24.1; 160/368.1, 160/327, 354, DIG. 18

[56] References Cited

U.S. PATENT DOCUMENTS

| | | | |
|---|---|---|---|
| 3,632,154 | 1/1972 | Woodrich | 296/39.3 X |
| 3,697,123 | 10/1972 | Gygrynuk | 296/24.1 |
| 4,100,957 | 7/1978 | Shelton | 160/354 X |
| 4,192,542 | 3/1980 | Hill | 296/173 |
| 4,544,195 | 10/1985 | Gunn | 160/DIG. 18 X |
| 5,025,848 | 6/1991 | Prochaska | 160/359 X |
| 5,238,282 | 8/1993 | Watson et al. | 296/24.1 |

*Primary Examiner*—Joseph D. Pape
*Attorney, Agent, or Firm*—Alfred C. Hill

[57] ABSTRACT

In an automotive vehicle having a first compartment for a vehicle operator and a second compartment disposed behind the first compartment having at least one of a rear door and a side door, the second compartment carrying equipment accessible from the at least one of these rear door and the side door, the equipment including a heat exchanger and a front panel having an upper portion containing certain selected ones of predetermined controls, gauges, an inlet and predetermined outlets and a lower portion containing others of the selected ones of the predetermined controls, the gauges, the inlet and the predetermined outlets, a thermal draft guard to protect the equipment from outside cold air drafts and to retain heat from the equipment in the vehicle comprising a sheet of flexible material; a first arrangement to secure the sheet in an opening of the at least one of the rear door and the side door; a plurality of transparent windows disposed in the sheet, certain ones of the windows being in registry with the upper portion of the front panel and others of the windows being in registry with the lower portion of the front panel, and a second arrangement associated with each of the plurality of windows to enable independent opening of each of the plurality of windows to enable selected access to the controls, the input and the outputs.

20 Claims, 1 Drawing Sheet

THERMAL DRAFT GUARD FOR AUTOMOTIVE VEHICLES

BACKGROUND OF THE INVENTION

The present invention relates to automotive vehicles of the van type and more particularly to a thermal draft guard for the rear compartment of such van type vehicles.

Van type vehicles can be of the custom van type, minivan type and utility van type. With each of these van type vehicles, when the side sliding door, or in some vans side doors that swing like a normal car door (a barn door type door), in the cargo or rear portion of the van and when the rear door of such a van are open, a draft caused by the outside air is present within the rear portion of the van. In certain instances, these drafts can cause the occupants in the rear portion of the van to be uncomfortable, or can cause the equipment in the rear portion of the van to be inefficient in operation. In minivans and in custom vans, when the side and/or the rear doors of the rear portion of the vans are opened during the summer, the hot drafts from the outside air upsets the air conditioning balance and o thereby makes the occupants of this portion of the van uncomfortable. The same is true in the winter, when the outside cold air is allowed to enter the van which upsets the heat provided by the heater of the vehicle. In the case of regular or utility vans, the worker employing such vans has cargo therein which he must get to at various times in the course of his employment and the undesired drafts from the outside make it uncomfortable for the worker inside the van. For instance, it has been a common practice in recent days for phone and electrical system workers to make their o splice; and other electrical connections within the van to protect: them from the inclement weather. To do this, either the side and/or rear doors in the rear portion of the van must be open at least slightly to permit the wires to enter the same for the worker to accomplish his task.

In other occupations, such as a carpet cleaner, a machine, is disposed within the rear portion of the van in such a manner that it is accessible through the side door, or the rear door of the rear or cargo portion of the van. The carpet cleaning machine employed in such instances, as well as other similar types of machines, have a heat exchanger therein which converts input water to either steam or hot; water, or a combination thereof. When drafts from the outside air, particularly during the cold winter weather, enters the cargo portion of the van the efficiency of the heat exchanger is reduced. Such a reduction in efficiency, reduces the efficiency of the rug cleaning and as a result the rug is not as clean and dry as desired.

SUMMARY OF THE INVENTION

An object of the present invention is to provide a thermal draft guard for either the side door or rear door in the rear or cargo portion of a van type vehicle so as to reduce the negative effects of drafts either of hot air or cold air.

A feature of the present invention is the provision in an automotive vehicle having a first compartment for a driver and a passenger and a second compartment for a selected one of cargo and passengers disposed behind the first compartment, the second compartment having at least one of a rear door and a side door, a thermal draft guard to protect the second compartment from outside drafts comprising a sheet of flexible material; first means to secure the sheet in an opening of the at least one of the rear door and the side door; at least one transparent window disposed at a predetermined location in the sheet to enable viewing from and into the second compartment; and second means disposed in the sheet associated with the window to enable opening and closing the window.

Another feature of the present invention is the provision in an automotive vehicle having a first compartment for a vehicle operator and a second compartment disposed behind the first compartment having at least one of a rear door and a side door, the second compartment carrying equipment accessible from at least one of the rear door and the side door, the equipment including a heat exchanger and a front panel having an upper portion containing certain selected ones of predetermined controls, gauges, an inlet and predetermined outlets and a lower portion containing others of the selected ones of the predetermined controls, the gauges, the inlet and the predetermined outlets, a thermal draft guard to protect the equipment from outside cold air drafts and to retain heat from the equipment in the vehicle comprising a sheet of flexible material; first means to secure the sheet in an opening of the at least one of the rear door and the side door; a plurality of transparent windows disposed in the sheet, certain ones of the windows being in registry with the upper portion of the panel and others of the windows being in registry with the lower portion of the front panel; and second means associated with each of the plurality of windows to enable independent opening of each of the plurality of windows to enable selected access to the controls, the input and the outputs.

BRIEF DESCRIPTION OF THE DRAWING

The above-mentioned and other features and objects of the present invention will become more apparent by reference to the following description taken in conjunction with the accompanying drawing, in which.

DESCRIPTION OF THE PREFERRED EMBODIMENTS

The thermal draft guard of the present invention is described herein in association with a regular or utility van carrying equipment that needs to be protected from cold air drafts. It should be kept in mind that the thermal guard of the present invention can also be employed with other type of vans, such as custom vans and minivans, to protect the occupants or cargo in the rear portion thereof from undesirable thermal drafts.

Figure 1:
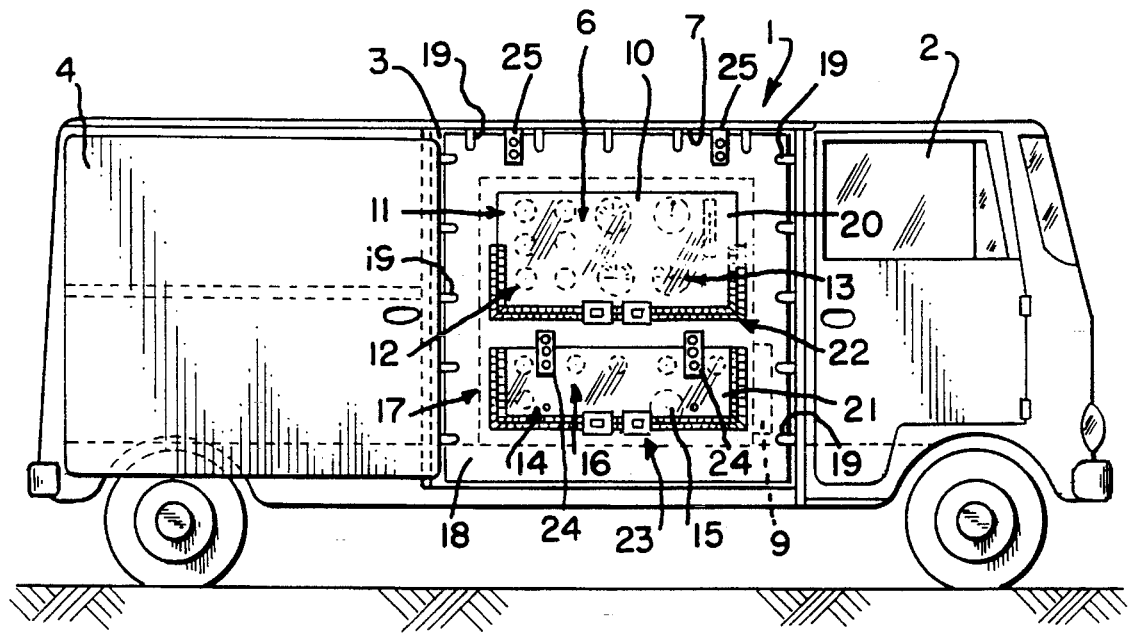
FIG. 1 is a side view of a van type vehicle carrying equipment therein protected from drafts by the thermal draft guard in accordance with the principles of the present invention.
Figure 2:
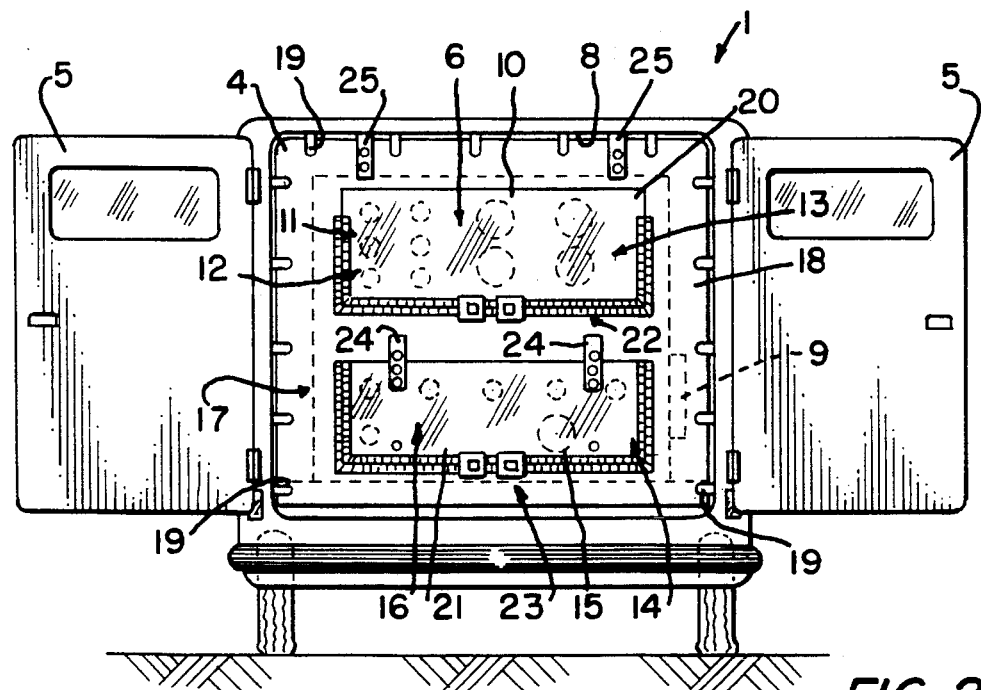
FIG. 2 is a rear view of a van type vehicle carrying equipment therein accessible from the rear door protected from drafts by the thermal draft guard in accordance with the principles of the present invention.

Referring to FIGS. 1 and 2, there is illustrated therein an automotive vehicle 1 of the van type having a first compartment 2 for the vehicle operator and possibly a passenger and a second compartment 3 for either cargo and/or passengers disposed behind the first compartment 2. Compartment 3 can have a side door 4 shown in its open position in FIG. 1 and possibly rear doors 5 shown in their open position in FIG. 2.

As illustrated in both FIGS. 1 and 2, the second compartment 3 is carrying equipment 6 accessible from opening 7 of the side door 4 in FIG. 1, or accessible through the opening 8 of the rear doors 5.

Equipment 6 may be any type of equipment employing a heat exchanger that converts cold water to hot water and/or steam, such as carpet cleaning equipment. The equipment 6 is shown in both FIGS. 1 and 2 as including a heat exchanger 9 and a front panel 10 having an upper portion 11 containing predetermined controls 12 and gauges 13 and a lower portion 14 containing an inlet 15 and a plurality of outlets 16.

In accordance with the principles of the present invention, the efficiency of heat exchanger 9 and the overall efficiency of equipment 6 is increased by employing the thermal draft guard 17 in accordance with the principles of the present invention. The thermal draft guard 17 protects equipment 6, particularly heat exchanger 9 from outside, cold air drafts and also acts to retain heat from equipment 6 in the vehicle.

The thermal draft guard includes a sheet of flexible material 18, such as a vinyl plastic. Sheet 18 is secured in the opening 7 of the side door 4 by means, in the form of a plurality of fastening devices 19, cooperatively connected to the vehicle 1 at a top and two sides of opening 7 and a top and two sides of sheet 18 to secure the sheet 18 in the opening 7 of the vehicle 1, as shown in FIG. 1. In FIG. 2 the sheet 18 employs a like plurality of fastening devices 19 to secure the sheet 18 in the opening 8 of the rear doors 5. The fastening means 19 may be well known snaps, or that type of device that includes a first part secured to the vehicle that extends through an opening in a second part thereof secured to the sheet 18 such that when the first part extends through the opening of the second part, the first part can be rotated to lock the first and second parts together.

The thermal draft guard 17 further includes as shown in FIGS. 1 and 2, a plurality of transparent windows 20 and 21 disposed in sheet 18. As illustrated in FIGS. 1 and 2, window 20 is in registry with the upper portion 11 of the front panel 10 and window 21 is in registry with the lower portion 14 of the front panel 10. As illustrated in FIGS. 1 and 2 the plurality of transparent windows number two. However, window 20 could be split in half or thirds with means to enable opening each one of these sections individually so that access can be had to the controls 12 and gauges 13 in the upper portion 11 of the front panel 10. Likewise the window 21 could be split in half or thirds to enable access to the inlet 15 and outlets 16 in the lower portion 14 of front panel 10 with each of these sections being provided with an arrangement to enable independent opening of the sections to enable the desired access to the lower portion 14 of panel 10.

It is to be kept in mind that only one window could be provided in the thermal draft guard when associated with a van type vehicle of the custom or minivan type to enable the viewing from and into the rear or second compartment by a passenger of the minivan or custom van type vehicle. In addition, this window assists the driver by eliminating blind spots when maneuvering the van.

To enable access to the controls 2 and gauges 13 of the upper portion 11 of front panel 10, window 20 is provided with a means, such as a zipper arrangement in the form of a double zipper 22, to enable independent opening of window 20 to enable access to the controls 12 and gauges 13. To enable access to the input 15 and the outputs 16 in the lower portion 14 of front panel 10, window 21 is provided with a means to enable independent opening of window 21 in the form of a zipper arrangement, such as double zipper 23.

Once the controls 12 are set in the upper portion 11 of the panel 10 for proper operation of the equipment 6, the window 20 will normally remain closed, but if slight adjustments are necessary the controls 12 can be moved from the outside of the sheet 18 due to the flexible nature of sheet 18.

In certain instances, it might be necessary to hold window 21 in its open condition. To this end, strap and snap arrangement 24 can be provided in association with window 21 so that the window 21 can be held partially open or rolled up and held open by the snap and strap arrangement 24.

When the equipment 6 is not in use, it might be desirable to move the sheet 18 out of the way. This can be accomplished by rolling the sheet 18 and securing the same by straps 25 fastened to the top of sheet 18 to thereby dispose the rolled up sheet 18 at the top of the opening 7 or 8.

The rolling up of sheet 18 and the securing the same at the top of the opening 7 by straps 25 is only necessary when the thermal draft guard 17 is not needed, such as during the summertime. This acts as a storage arrangement for the sheet 18. During the cold weather, when the sheet 18 is necessary, the sheet 18 is secured in a relationship to the opening 7 or 8 to enable closing the associated door in between jobs to thereby negate the necessity of rolling up the sheet 18 in between jobs.

While I have described above the principles of my invention in connection with specific apparatus, it is to be clearly understood that this description is made only by way of example and not as a limitation to the scope of my invention as set forth in the objects thereof and in the accompanying claims.

I claim:

1. In an automotive van-type vehicle having a first compartment for a driver and a passenger and a second compartment for a selected one of cargo and passengers disposed behind said first compartment, said second compartment having at least one of a rear door and a side door, a thermal draft guard to protect said second compartment from outside drafts comprising:

a sheet of flexible material;

first means to secure said sheet to and interior of said second compartment to maintain said sheet within said interior and in an opening of said at least one of said rear door and said side door;

at least one transparent window disposed at a predetermined location in said sheet to enable viewing from and into said second compartment; and second means disposed in said sheet associated with said window to enable opening and closing said window.

2. A thermal draft guard according to claim 1, wherein said first means includes
   a plurality of fastening devices cooperatively connected to said interior of said second compartment at a top and two sides of said opening and a top and two sides of said sheet to secure said sheet in said opening.

3. A thermal draft guard according to claim 2, wherein said second means includes
   a zipper means to enable opening and closing said window.

4. A thermal draft guard according to claim 3, wherein said zipper means includes
   a double zipper.

5. A thermal draft guard according to claim 1, wherein said second means includes
   a zipper means to enable opening and closing said window.

6. A thermal draft guard according to claim 5, wherein said zipper means includes
   a double zipper.
7. A thermal draft guard according to claim 1, wherein said flexible material is a vinyl plastic.
8. A thermal draft guard according to claim 1, wherein said first means secures said sheet in a relationship to said opening to enable closing said at least one of said rear door and said side door with said sheet in position to protect said second compartment from said outside drafts.
9. A thermal draft guard according to claim 1, further including
   third means connected to said sheet adjacent a top thereof to enable securing said sheet in a rolled up condition adjacent a top of said opening.
10. A thermal draft guard according to claim 1, further including
    third means associated said sheet and said window to enable holding said window in an open condition.
11. In an automotive vehicle having a first compartment for a vehicle operator and a second compartment disposed behind said first compartment having at least one of a rear door and a side door, said second compartment carrying equipment accessible from said at least one of said rear door and said side door, said equipment including a heat exchanger and a front panel having an upper portion containing certain selected ones of predetermined controls, gauges, an inlet and predetermined outlets and a lower portion containing others of said selected ones of said predetermined controls, said gauges said inlet and said predetermined outlets, a thermal draft guard to protect said equipment from outside cold air drafts and to retain heat from said equipment in said vehicle comprising:
    a sheet of flexible material;
    first means to secure said sheet in an opening of said at least one of said rear door and said side door;
    a plurality of transparent windows disposed in said sheet, certain ones of said windows being in registry with said upper portion of said front panel and others of said windows being in registry with said lower portion of said front panel; and
    second means associated with each of said plurality of windows to enable independent opening of each of said plurality of windows to enable selected access to said controls, said inputs and said outputs.
12. A thermal draft guard according to claim 11, wherein said first means includes
    a plurality of fastening devices cooperatively connected to said vehicle at a top and two sides of said opening and a top and two sides of said sheet to secure said sheet in said opening.
13. A thermal draft guard according to claim 12, wherein said second means includes
    a plurality of zipper means each associated with a different one of said plurality of windows to enable opening and closing each of said plurality of windows.
14. A thermal draft guard according to claim 13, wherein each of said plurality of zipper means includes
    a double zipper.
15. A thermal draft guard according to claim 11, wherein said second means includes
    a plurality of zipper means each associated with a different one of said plurality of windows to enable opening and closing each of said plurality of windows.
16. A thermal draft guard according to claim 15, wherein each of said plurality of zipper means includes
    a double zipper.
17. A thermal draft guard according to claim 11, wherein said flexible material is a vinyl plastic.
18. A thermal draft guard according to claim 11, wherein said first means secures said sheet in a relationship to said opening to enable closing said at least one of said rear door and said side door with said sheet in position to protect said equipment from said outside drafts and to retain heat from said equipment in said vehicle.
19. A thermal draft guard according to claim 11, further including
    third means connected to said sheet adjacent a top thereof to enable securing said sheet in a rolled up condition adjacent a top of said opening.
20. A thermal draft guard according to claim 11, further including
    third means associated said sheet and each of said plurality of windows to enable holding each of said plurality of windows in an open condition.

* * * * *